G. W. PACKER.
GATHERING REEL.
APPLICATION FILED JULY 30, 1920.

1,438,394.

Patented Dec. 12, 1922.
3 SHEETS—SHEET 1.

Inventor
Glenn W. Packer
By: Clarence J. Poole Atty.

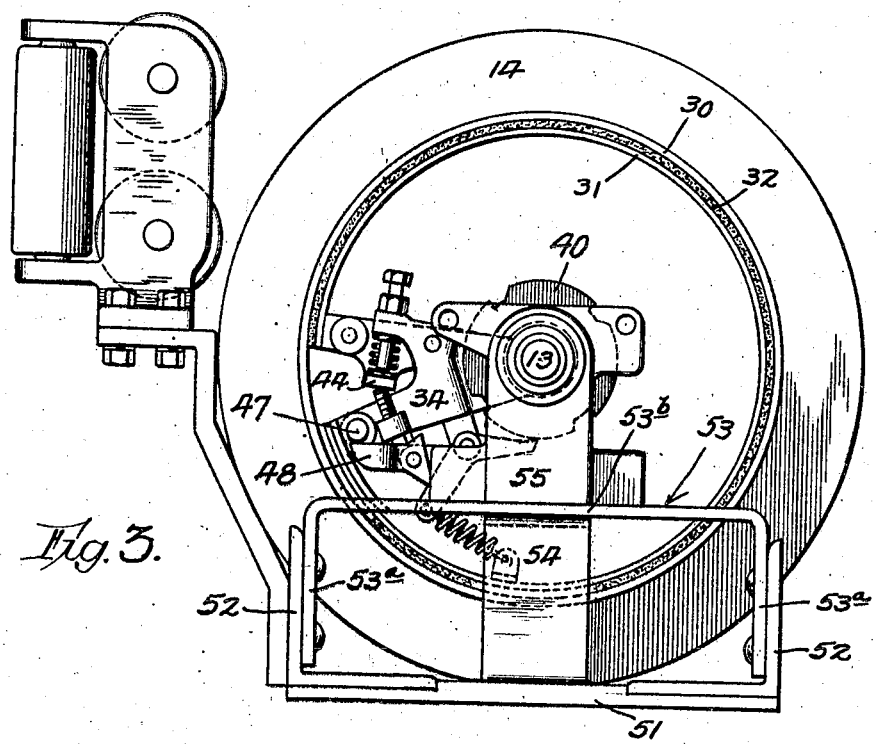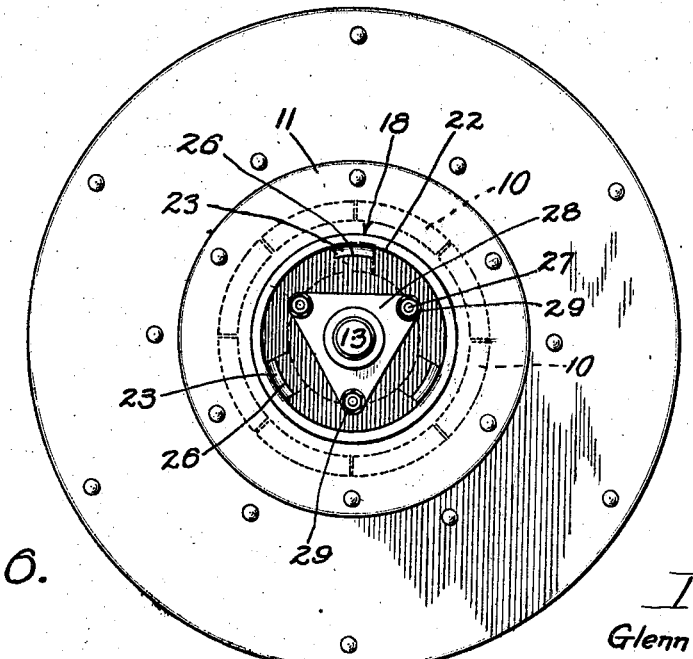

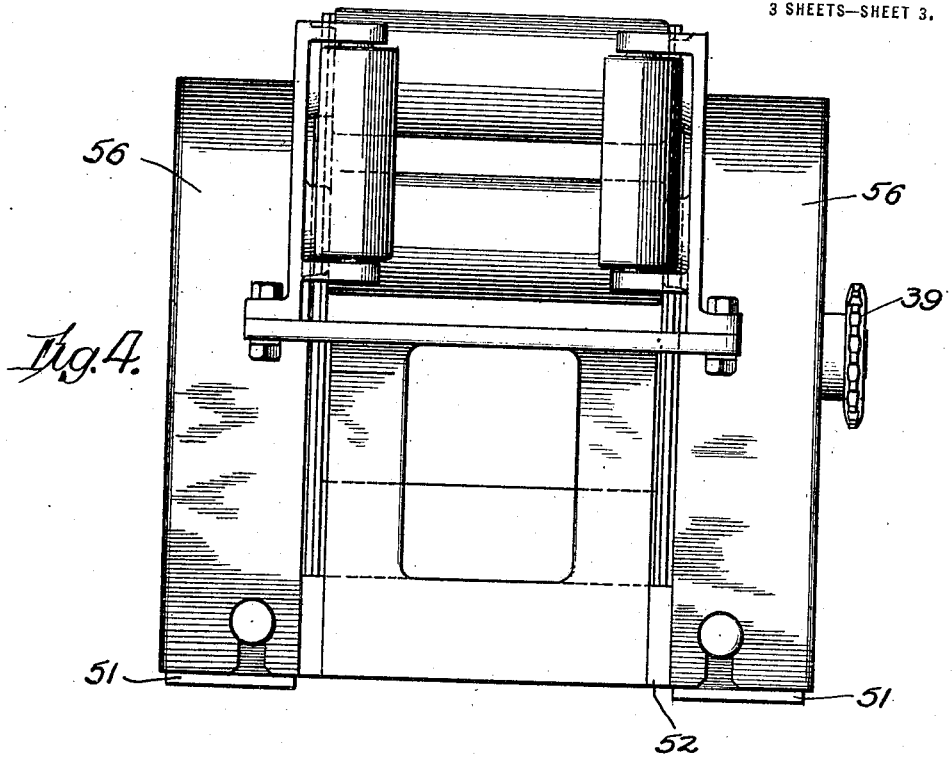
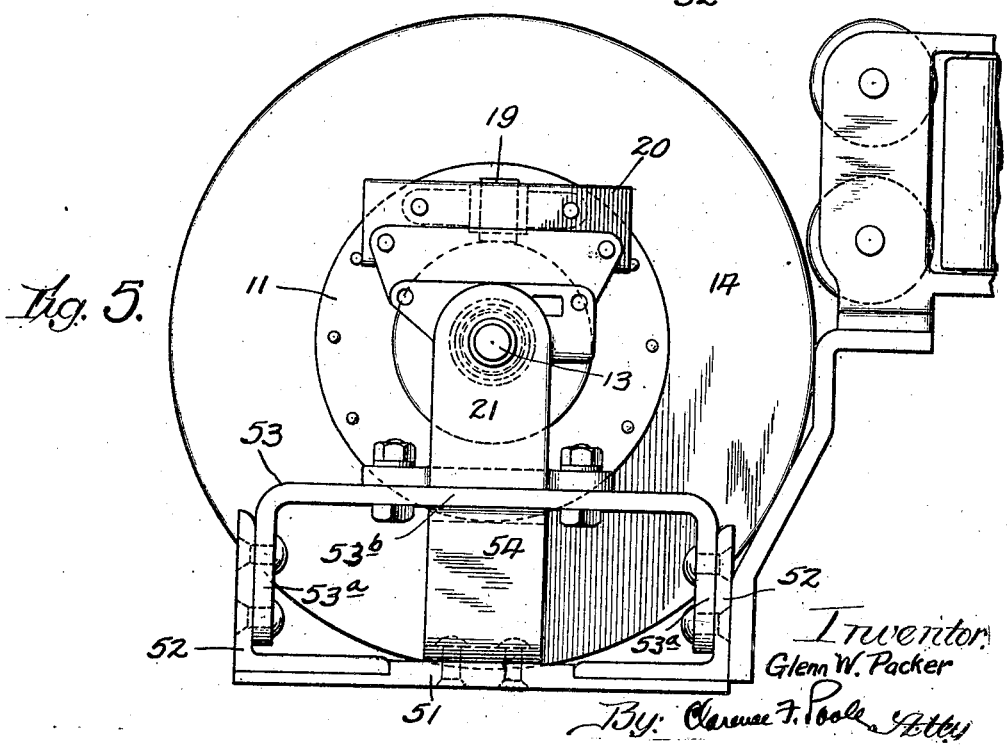

Patented Dec. 12, 1922.

1,438,394

UNITED STATES PATENT OFFICE.

GLENN W. PACKER, OF CHICAGO, ILLINOIS, ASSIGNOR TO GOODMAN MANUFACTURING COMPANY, OF CHICAGO, ILLINOIS, A CORPORATION OF ILLINOIS.

GATHERING REEL.

Application filed July 30, 1920. Serial No. 400,251.

*To all whom it may concern:*

Be it known that I, GLENN W. PACKER, a citizen of the United States, residing at Chicago, in the county of Cook and State of Illinois, have invented a Gathering Reel, of which the following is a specification.

This invention relates to gathering reels adapted to be mounted on mining locomotives and has for its principal object to provide a device of the class described that shall be simple and durable in construction, and adapted to occupy a minimum amount of space.

Electrically operated locomotives are frequently provided with conductor cables adapted to afford electrical connections to the trolley wires when the locomotive is being operated over areas of track which are not supplied with feed wires. Under these conditions the conductor cable is usually carried by a gathering reel mounted on the locomotive, which reel is usually either operatively connected to the locomotive axle, or is driven by an independent motor so as to wind the conductor cable on the reel as the locomotive approaches the point of connection of the conductor cable to the feed wire.

With gathering reels of the class above described, it is desirable to maintain a slight tension on the conductor cable as the cable is being wound on the reel. On the other hand, as the conductor cable is unreeled, it is desirable to provide a slight braking action to the reel so as to eliminate "over-running" of the same.

In the present invention I provide a simple and durable construction for the cable reel, including a clutch mechanism which provides a continuous tension in the conductor cable as it is being wound on the reel, and also provides an automatic braking action in the reel when it is moved in the opposite direction to unwind the cable therefrom. The invention consists in the combination, construction, and arrangement of parts as will hereinafter be described in connection with the accompanying drawings, and more particularly defined in the appended claims.

In the drawings, Figure 1 is a vertical longitudinal section of the gathering reel embodying my invention.

Figure 3 is a view similar to Figure 2, but with the clutch mechanism moved to a different operating position.

Figure 4 is a view in elevation of the gathering reel.

Figure 5 is a view of the side opposite that of Figures 2 and 3, with the cover plate removed to show the collector ring.

Figure 6 is a detail.

Figure 1:
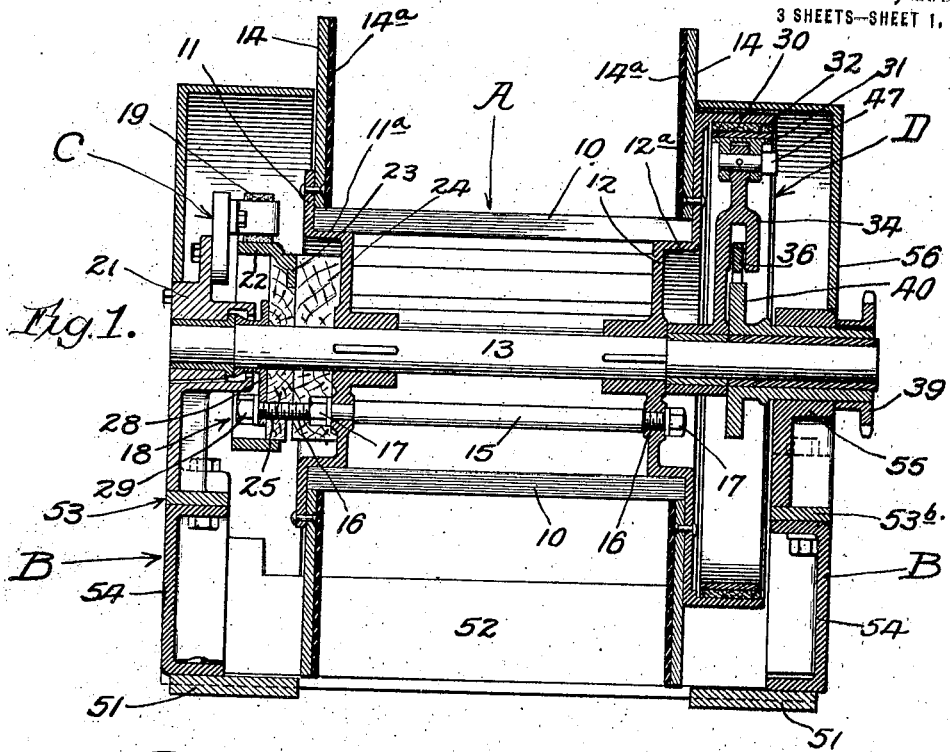

Referring now to details of the construction of the embodiment illustrated in the drawings, the gathering reel comprises a body portion A mounted on supports B, B, and having a collector ring device C at one end, and a clutch mechanism D at the opposite end thereof. The body portion A comprises a plurality of longitudinally extending frame members 10, 10, arranged in the form of a cylinder and clamped at their ends between the end plates 11 and 12. The frame members are preferably made of wood or other non-conducting material. The end plates 11 and 12 are provided with annular shoulders $11^a$ and $12^a$, respectively, concentrically arranged with respect to the reel shaft 13. Radially extending discs 14, 14, having insulated inner surfaces $14^a$, $14^a$, are attached to the outer peripheries of the end plates 11 and 12. The frame members 10 are preferably arranged with their ends between the inner margin of the discs 14, 14 and the shoulders $11^a$ and $12^a$ of the end plates so as to be secured therebetween, as shown in Figure 1. The end plates 11 and 12 are keyed or otherwise attached to the shaft 13 and are clamped together by a plurality of longitudinal extending tie rods 15, 15, having threaded end portions 16, 16, extending thru the end plates and provided with retaining nuts 17, 17.

Gathering reels of the class herein described are usually provided with a collector ring and brush suitable for conducting the electric current from the rotating reel to the locomotive. In the present construction, the collector ring mechanism is indicated at C and comprises a ring 18 carried by and moving with the reel, and a brush 19, suitably mounted in the bracket 20 on the end bearing 21. In the present invention, I provide a novel construction and mounting for the collector ring 18, which comprises an annular contact portion 22, and a plurality of inwardly extending lugs 23, 23. The collector ring is seated on a suitable insulated block 24 mounted adjacent the end plate 11. A second insulating block 25 having a series of recesses 26, 26 on its under face adapted to register with the lugs 23, 23, fits inside of the collector ring and against the block 24 so as to retain the collector ring in position thereagainst. Suitable retaining means for securing the blocks 24 and 25 to the end plate 11 comprises a plurality of extensions 27, 27 on the tie rods 15, 15, which project thru the insulating blocks 24 and 25 and a retaining plate 28 carried on the shaft 13, as shown. The retaining plate and insulating blocks are secured by means of nuts 29, 29, on the threaded extensions 27, 27, as shown.

Figure 2:
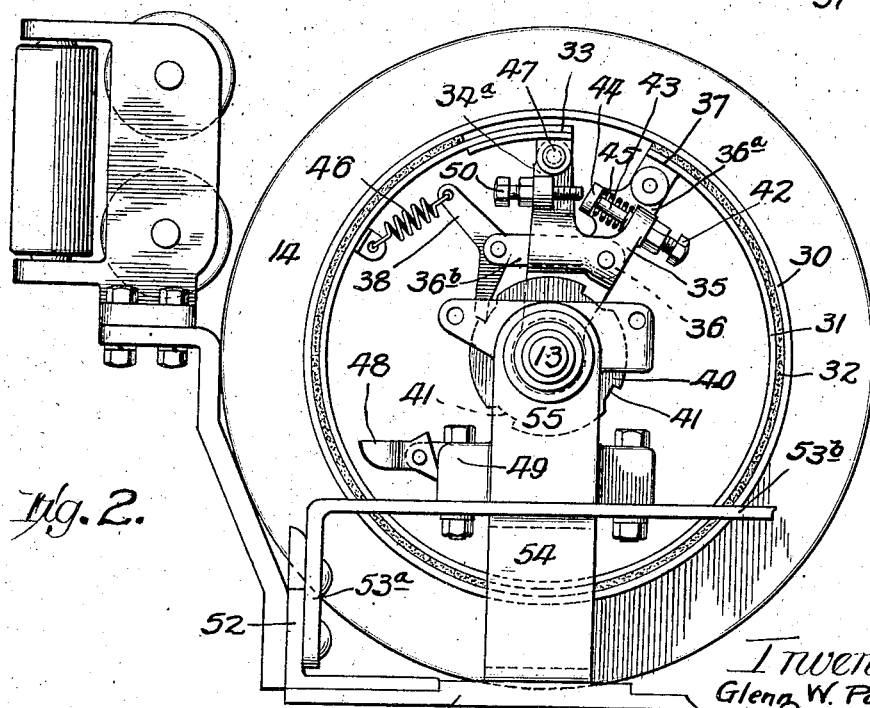
Figure 2 is a side view of the reel with the end housing removed to show the friction clutch mechanism.

The clutch mechanism D comprises a friction drum 30, which may be integral with the end plate 12. An internal expanding friction band 31 is mounted in the drum 30 and is faced with a suitable friction resisting substance 32. One end 33 of the friction band, is pivotally connected to a supporting frame 34 journaled on the shaft 13. Said frame 34 comprises a main portion 34$^a$ and a laterally extending portion 35. A bell-crank lever 36 is pivoted on the frame portion 35, and has an arm 36$^a$ pivotally attached to the end 37 of the friction band opposite to the first mentioned end 33. The second arm 36$^b$ of the bell-crank lever extends across the main portion 34$^a$ of the supporting frame and is provided at its end with a rocking dog 38. A sprocket wheel 39 or similar power transmitting means is operatively connected with the disk 40, provided with a plurality of notches 41, 41. Said sprocket may be driven from the locomotive axle, or by an independent motor, as desired, so that when the locomotive is advancing toward the point of connection of the conductor cable to the supply wires, the disk 40 is driven in a clockwise direction (see Figure 2), and the dog 38 becomes engaged in one of the notches 41 on said disk. The bell-crank lever 36 is rocked outwardly so as to expand the ends of the friction band 31 and provide thereby a frictional engagement with the drum 30, transmitting the driving torque to the reel. As before suggested, it is desirable to maintain a tension on the conductor cable as it is being wound on the reel, and to this end I provide an adjustment whereby the amount of expansion of the friction band may be limited. This arrangement comprises a lock nut 42 carried by the projecting member 35 on the frame 34 and having an end portion 43 adapted to engage a lug 44 on the arm 36$^a$ of the bell-crank lever. The lug 44 is preferably arranged so as to be positioned intermediate the main portion 34$^a$ of the frame 34 and the member 35 extending laterally therefrom. A spring 45 is mounted intermediate the arm 35 and the lug 44 and is adapted to contract the friction band when the driving torque is relieved. Tension means for the dog 38 comprises a spring 46 preferably connected with the friction band 31 so as to maintain said dog in operative position with the disk 40. It will now be clear that with the construction above described, the sprocket 39 and disc 40 may be driven at a rate slightly greater than that necessary to retrieve the conductor cable on the reel, but the set screw 42 is so adjusted as to limit the amount of expansion of the friction band. The friction band may thus be maintained to exert a slipping friction on the drum to drive the same and maintain tension on the cable. It will also be noted, that the arrangement of the dog 38 and notches 41, 41 is such that the reel can be driven in but one direction to wind the cable thereon.

Referring now to the arrangement for applying a brake to the reel during the time that the locomotive is moving away from the point of connection to the conductor cable and the latter is being withdrawn from the reel, it will be seen that I utilize the friction band 30 for this purpose. It is manifest that the braking friction must be considerably less than that necessary to drive the reel. Accordingly, when the direction of rotation of the reel is reversed so as to unwind the cable therefrom, the reel will move in the counter-clockwise direction in Figure 2. The driving mechanism operating thru the sprocket 39, is disconnected by any suitable arrangement, such as a releasing clutch, so as to allow the sprocket 39 and disk 40 to rotate freely in a counter-clockwise direction. The spring 45 between the projecting member 35 and the bell-crank arm 36$^a$ tends to contract or draw the ends 33 and 37 of the friction band together. As the clutch mechanism rotates, a projection 47 on the supporting frame 34 comes into engagement with a dog 48 mounted on the frame member 49, the said dog being arranged so as to allow the projection 47 to pass it while the reel is being wound, or rotated in the clockwise direction, but will check the rotation of the frame 34 when it is being unwound, or rotated in the counter-clockwise direction. When the reel is being unwound, therefore, the clutch mechanism takes the position shown in Figure 3, in which the friction band is contracted to a degree sufficient to apply the necessary braking action and retard the cable reel so as to eliminate the danger of "over-running" of the conductor cable. I provide means for adjusting the braking tension by means of a set screw 50 mounted on the main portion of the arm 34 so as to engage with the side of the lug 44 opposite to the set screw 50. It will thus be seen that the set screws 42 and 50 are adjustable; the former to limit the expansion of the brake band so as to provide the necessary driving friction, and the latter limiting the contraction of the brake band so as to provide the necessary braking action when the reel is rotated in the opposite direction.

The supporting frames B, B each comprise a base plate 51 and a pair of oppositely disposed L-bars 52, 52 attached to, and extending between, the base plates 51, 51. An inverted U-member 53 has end portions 53ª, 53ª each attached to the L-members 52, 52, and a central elongated portion 53ᵇ, spaced above and parallel to the base plate 51. A centrally disposed supporting block 54 extends from the base plate 51 upwardly to the cross member 53ᵇ. The bearing mountings of the reel are mounted above said cross member 53ᵇ, and comprise a bearing 21 at one end of the reel adjacent the collector ring device C, and a similarly disposed bearing member 55 on the opposite end of the reel. Cover plates 56, 56, are provided to cover the mechanism at each end of the reel, as shown.

Having described my invention what I claim as new and desire to cover by Letters Patent, is:

1. In a gathering reel, the combination of a reel, a shaft for said reel, a support for said shaft, a friction drum on the reel having an internal expanding band mounted therein, a frame journaled on the shaft having two relatively movable arms each connected to adjacent ends of said friction band, driving mechanism for said reel, means affording operative connection between said frame and said driving mechanism to drive the reel in one direction, means on said frame actuated by the driving torque to expand the arms of said frame relatively to each other, and means limiting the rotation of said frame in the direction opposite to that in which the reel is driven.

2. In a gathering reel, the combination of a reel, a shaft for said reel, a support for said shaft, a friction drum on the reel having an internal expanding band mounted therein, a frame journaled on the shaft having two relatively movable arms each connected to adjacent ends of said friction band, driving mechanism for said reel, means affording operative connection between said frame and said driving mechanism to drive the reel in one direction, means on said frame actuated by the driving torque to expand the arms of said frame relative to each other, means limiting the relative expansion of said arms, and means limiting the rotation of said frame in the direction opposite to that in which the reel is driven.

3. In a gathering reel, the combination of a reel, a shaft for said reel, a support for said shaft, a friction drum on the reel having an internal expanding band mounted therein, a frame journaled on the shaft having two relatively movable arms each connected to adjacent ends of said friction band, driving mechanism for said reel, means affording operative connection between said frame and said driving mechanism to drive the reel in one direction, means on said frame actuated by the driving torque to expand the arms of said frame relative to each other, means limiting the relative expansion and contraction of said arms, and means limiting the rotation of said frame in the direction opposite to that in which the reel is driven.

4. In a device of the class described, a reel, a friction drum operatively connected with said reel, a frame rotatably mounted concentric with said drum, driving mechanism for said reel, friction means carried by and movable respective to said frame, ratchet mechanism affording operative connection between said frame and driving means in one direction of rotation of the latter, means on said frame actuated by the driving torque to move said friction means into driving engagement with the drum and means limiting the rotation of said frame in the direction opposite to that in which it is driven.

5. In a device of the class described, a reel, a friction drum operatively connected with said reel, a frame rotatably mounted concentric with said drum, driving mechanism for said reel, friction means carried by and movable respective to said frame, ratchet mechanism affording operative connection between said frame and driving means in one direction of rotation of the latter, means on said frame actuated by the driving torque to move said friction means into driving engagement with the drum, means limiting the relative movement of said friction means and said frame, and means limiting the rotation of said frame in the direction opposite to that in which it is driven.

6. In a device of the class described, a reel, a friction drum operatively connected with said reel, a frame rotatably mounted concentric with said drum, driving mechanism for said reel, friction means carried by and movable respective to said frame, ratchet mechanism affording operative connection between said frame and driving means in one direction of rotation of the latter, tension means normally maintaining said friction means out of driving engagement with the drum, means on said frame actuated by the driving torque to move said friction means into driving engagement with the drum, means limiting the relative movement of said friction means and said frame, and means limiting the rotation of said frame in the direction opposite to that in which it is driven.

Signed at Chicago, Illinois, this 24 day of July, A. D. 1920.

GLENN W. PACKER.